(12) United States Patent
García Patino et al.

(10) Patent No.: US 8,991,759 B2
(45) Date of Patent: Mar. 31, 2015

(54) REAR FUSELAGE OF AN AIRCRAFT

(75) Inventors: Mª Aránzazu García Patino, Madrid (ES); Angel Postigo Rodríguez, Getafe (ES); David López Fernández, Rivas Vaciamadrid (ES)

(73) Assignee: Airbus Operations, S.L., Madrid (ES)

( * ) Notice: Subject to any disclaimer, the term of this patent is extended or adjusted under 35 U.S.C. 154(b) by 98 days.

(21) Appl. No.: 13/242,003

(22) Filed: Sep. 23, 2011

(65) Prior Publication Data
US 2012/0074260 A1 Mar. 29, 2012

(30) Foreign Application Priority Data
Sep. 24, 2010 (ES) .................... 201031420

(51) Int. Cl.
*B64C 1/00* (2006.01)
*B64C 1/06* (2006.01)
*B64D 41/00* (2006.01)

(52) U.S. Cl.
CPC ........... *B64C 1/068* (2013.01); *B64D 2041/002* (2013.01)
USPC ............ 244/120; 244/130; 244/131; 244/119

(58) Field of Classification Search
USPC .......... 244/120, 131, 130, 117 R, 119, 137.1; 411/136; 403/61, 114; 296/181.5
See application file for complete search history.

(56) References Cited

U.S. PATENT DOCUMENTS

| | | | | |
|---|---|---|---|---|
| 4,929,136 A | * | 5/1990 | Mee | 411/432 |
| 7,406,777 B2 | * | 8/2008 | Grover et al. | 33/645 |
| 7,857,565 B2 | * | 12/2010 | Martinson | 411/136 |
| 8,016,237 B2 | * | 9/2011 | Berry et al. | 244/131 |
| 2008/0099611 A1 | * | 5/2008 | Martino Gonzalez et al. | 244/119 |

* cited by examiner

*Primary Examiner* — Tien Dinh
*Assistant Examiner* — Vicente Rodriguez
(74) *Attorney, Agent, or Firm* — Oblon, McClelland, Maier & Neustadt, L.L.P.

(57) ABSTRACT

Rear fuselage of an aircraft comprising a tail cone end and a rest of the real fuselage whereby the tail cone end is attached to the rest of the rear fuselage by means of an attachment system comprising two upper lugs, two lower lugs and a detachable balancer fitting. The balancer fitting is an adjustable fitting, being locked in a Z and Y directions of a Cartesian axis and being movable along an X direction of the Cartesian axis providing guidance for the tail cone end and the rest of the rear fuselage.

5 Claims, 5 Drawing Sheets

E-E

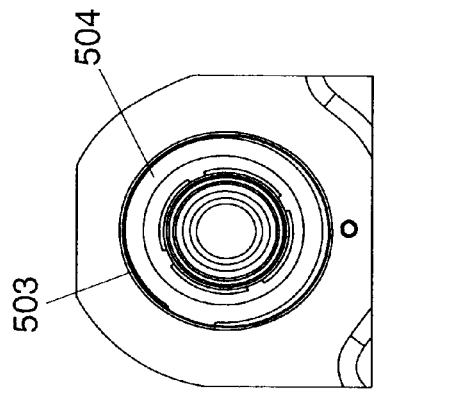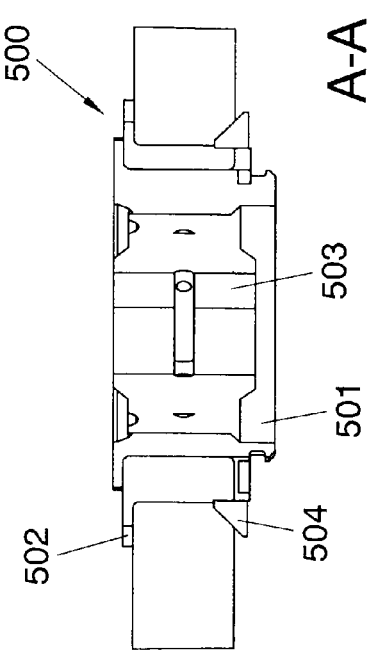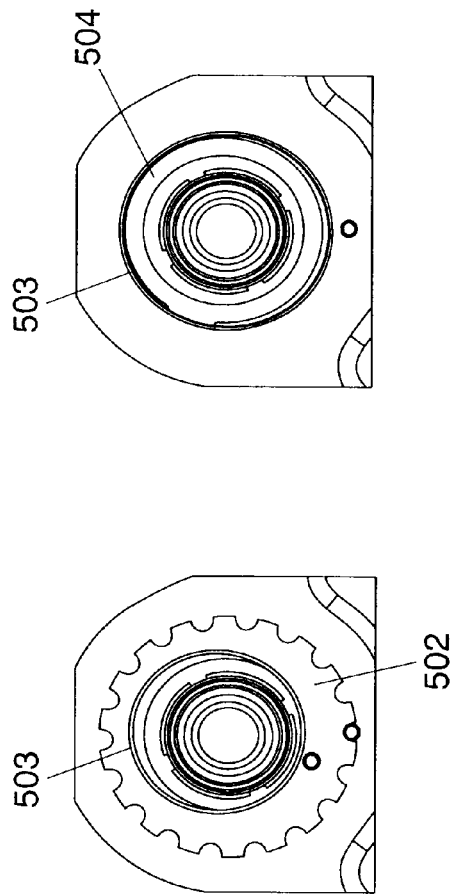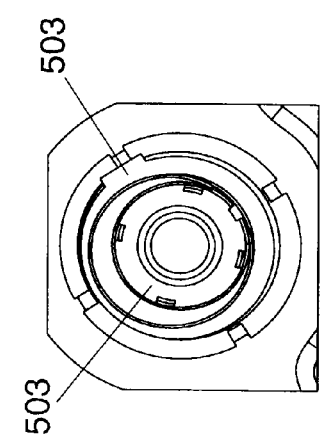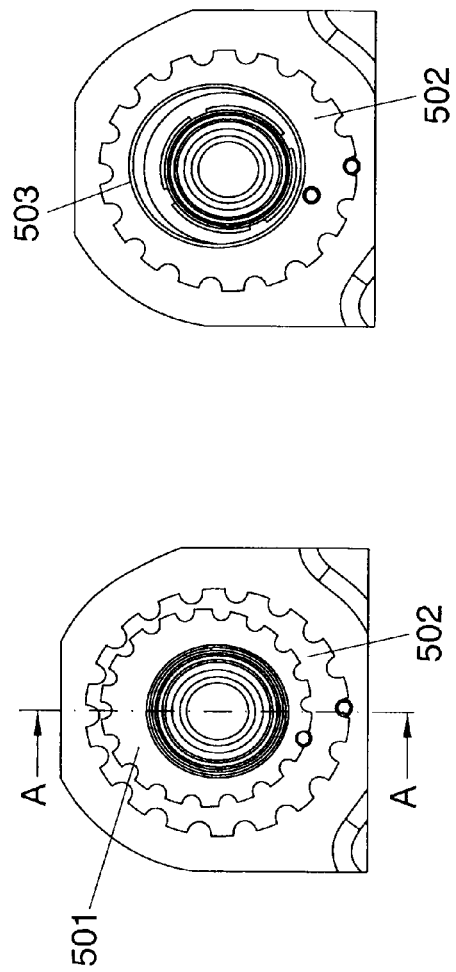

REAR FUSELAGE OF AN AIRCRAFT

OBJECT OF THE INVENTION

The object of the present invention is to ensure the interchangeability of the tail cone end of an aircraft in cases it has to be disassembled from the rest of the rear fuselage of the aircraft, for any purposes or in cases it has to be changed for a different one.

In other words, the main object of the present invention is to provide a new solution for the joint between the tail cone end of an aircraft and the rest of the rear fuselage of said aircraft.

It is a further object of the present invention to relax hiperstaticity of the joint between both sections, the tail cone end and the rest of the rear fuselage, thus easing their assembly and future maintenance operations.

It is a further object of the present invention to provide a joint which allows adjusting processes during the assembly of the different sections of an aircraft without incurring additional work further to the established assembly work.

It is a further object of the invention to avoid the extra strengths and tensions that the different elements of a rear fuselage of an aircraft suffer during the assembly and maintenance operations.

It is another object of the invention to provide a joint which absorbs shear loads.

In particular, the present invention is suitable in cases in which the approaching movement of the tail cone end must be horizontal.

FIELD OF THE INVENTION

The present invention falls within the aeronautical industry and relates to the configuration of a rear fuselage of an aircraft having a modular tail cone end.

More particularly, the present invention relates to methods of joining the tail cone end to the rest of the rear fuselage of an aircraft and the type of fittings used.

BACKGROUND OF THE INVENTION

As a general rule, an aircraft comprises a fuselage having a front portion in which a cockpit is arranged, a main portion that bears the wings and a rear fuselage that supports the horizontal and the vertical stabilizers.

Normally, the rear fuselage of the aircraft ends in a modular tail cone end. The rear fuselage houses the auxiliary power unit (APU) of the aircraft.

Thus, when assembling an aircraft, at the rear fuselage, the interface between the tail cone end and the rest of the rear fuselage is normally designed with four fittings or lugs, two upper ones and two lower ones, for supporting the loads, plus a balancer fitting capable of transmit loads and used also to align or centering the positioning of the different parts during the assembly process. Moreover, the balancer is used as a fail safe solution. This type of construction derives from the fail safe operability standards requested by the air navigation laws. Hence, in case of losing one of the fittings or lugs the aircraft always has four more in order to carry the loads.

The typical method for assembling the tail cone end to the rest of the rear fuselage follows these steps:
 a) To install the balancer which guides and aligns the sections;
 b) To install the lower fittings or lugs; and lastly
 c) To install and adjust the upper fittings.

The problem encountered by the above method is found in the final assembly line (FAL) in which the tail con end and the rear fuselage are joined. The problem is that once the first three fittings are adjusted (two lower ones plus the balancer according to points a) and b) above) problems to adjust the upper fittings are found due to tolerances and due to the elimination of the freedom degrees.

Traditionally the above problem was solved by adding a new step, before step c). Once the three lower fittings (two lower lugs plus balancer) are adjusted, the balancer is disassembled, then the upper fittings are adjusted and the balancer is re-assembled again. This solution involves expensive costs and an increase of time for the FAL as it is not part of the standard procedure for assembling the tail cone end to the rest of the rear fuselage.

In addition, since the rear fuselage houses the auxiliary power unit (APU) of the aircraft, the joint between the tail cone and the rest of the rear fuselage depends on the location of the air intake of the auxiliary power unit. Thus, in cases where the auxiliary power unit air intake is in a lower location, the balancer is in an upper position whereas in cases where the auxiliary power unit air intake is in an upper location, the balancer is in a lower position.

DESCRIPTION OF THE INVENTION

The present invention is designed to overcome the above-mentioned drawbacks present in the final assembly line (FAL) in which a tail cone end of an airplane is assembled to the rest of the rear fuselage of the airplane.

According to the invention, the rear fuselage of an aircraft comprises a tail cone end. The tail cone end is attached to the rest of the rear fuselage by means of an attachment system that comprises two upper lugs, two lower lugs and a detachable balancer fitting.

The balancer fitting described by the invention has the particularity of being an adjustable fitting. The balancer fitting proposed is locked in Z and Y directions of a Cartesian axis and movable along an X direction of a Cartesian axis. Thus, the balancer fitting of the present invention allows changing the interface point by allowing an adjustment in the Z and Y directions of a Cartesian axis and in addition is able to slide along the X direction of a Cartesian axis. The balancer fitting provides guidance for the attachment of the upper lugs and the lower lugs required for joining the tail cone end and the rest of the rear fuselage.

In an embodiment of the present invention, the balancer fitting is a two parts fitting comprising a first fitting, a second fitting which are independent and are joined by screws. The screws are ribbed bolts in order to bear the adjustments in the Z and Y directions of a Cartesian axis that the fitting allows to do.

In another embodiment of the invention where the balancer fitting is a two parts fitting comprising a first fitting, a second fitting, the means of the balancer fitting to modify the interface point by allowing an adjustment in the Z and Y direction of a Cartesian axis are a fluting contact surface in the first fitting and a fluting contact surface in the second fitting.

In another embodiment of the invention, the balancer fitting is a combination of excentrical bushings having an external excentrical bushing and an internal excentrical bushing.

In a preferred embodiment of the invention, where the balancer fitting is a combination of excentrical bushings, it further comprises an external excentrical bushing, an internal excentrical bushing, a bearing mounted on the internal excentrical bushing, and a washer.

In another embodiment of the invention where the balancer fitting is a combination of excentrical bushings having at least an external excentrical bushing, an internal excentrical bushing, a bearing and a washer, the means of the balancer fitting to modify the interface point by allowing an adjustment in the Z and Y direction of a Cartesian axis are the external excentrical bushing and the internal excentrical bushing.

During the previous setting of the components, as the external and the internal bushings are excentrical, they adjust to the interface point of the bearing. When that adjustment has been made, the external excentrical bushing and the internal excentrical bushing rotate together.

In a preferred embodiment of the invention, the bearing is a ball-and-socket joint.

The invention further describes a method of assembly of the tail cone end to the rest of the rear fuselage of an aircraft. The method comprising the following steps:
a) to install the balancer fitting;
b) to install the lower lugs; and
c) to install the upper lugs.

The balancer fitting remains installed while installing the rest of the fittings (lower lugs or upper lugs).

The balancer is the first element which has to be installed because it acts as a guide for the tail cone end in order to position it for the assembly with the rest of the rear fuselage.

In an embodiment of the invention, the installation of the upper lugs can be done before the installation of the lower lugs.

In a preferred embodiment of the invention, the installation of the lower lugs is done before the installation of the upper lugs because they are placed closer to the balancer fitting thus facilitating the adjustment tolerances and the accessibility of the people that has to assure the assembly.

If there are problems with the fitting of the elements, especially when assembling the upper fittings which are the last to be installed, the balancer fitting can be adjusted in order to solve those problems without the need of disassembly the joint.

BRIEF DESCRIPTION OF THE DRAWINGS

The present invention will be entirely understood on the basis of the following detailed description of its preferred embodiments and the accompanying drawings that are filed solely as an example and are therefore not restrictive of the scope of the present invention, and in which:

FIGS. 5a to 5e show the balancer fitting according to a second embodiment of the present invention, being 5a, 5b and 5c top views, 5d a bottom view and 5e a cross sectional view along line A-A sketched in FIG. 5a.

REFERENCES

Figure 1:
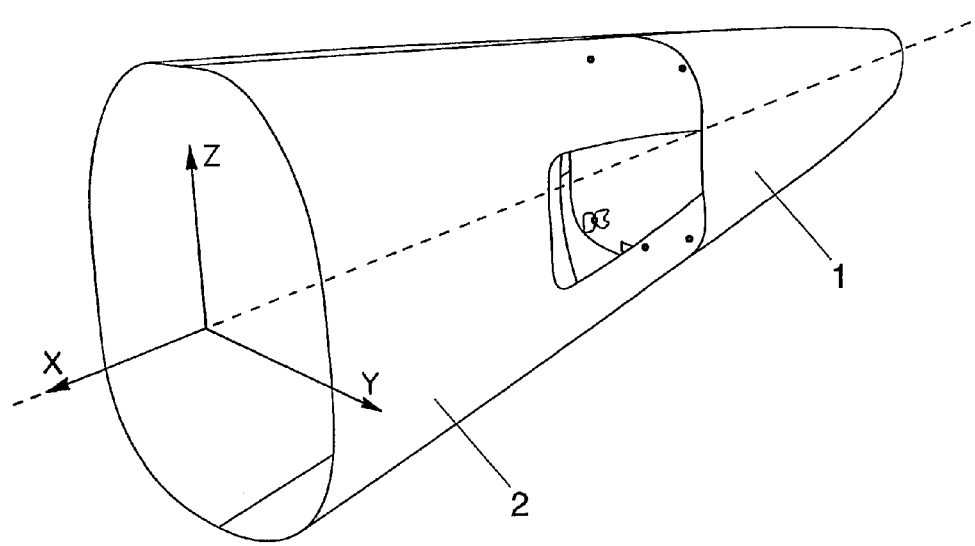
FIG. 1 depicts a rear fuselage of an aircraft showing the tail cone end (1) and the rest of the rear fuselage (2).

1: tail cone end
2: rest of rear fuselage
3: upper lug
4: lower lug
5: balancer
51: first fitting
52: second fitting
53: bearing
54: frame
55: fluting contact surface of the first fitting 51
56: hollow space for seal allocation
57: first concentric hole
58: screws
59: second concentric hole
60: extended holes
61: fluting contact surface of the second fitting 52
501: internal excentrical bushing
502: external excentrical bushing
503: bearing
504: washer

DESCRIPTION OF A PREFERRED EMBODIMENT

The following description is provided for the benefit of the reader only, and is not intended to limit in any way the invention as set forth by the claims.

Figure 2:
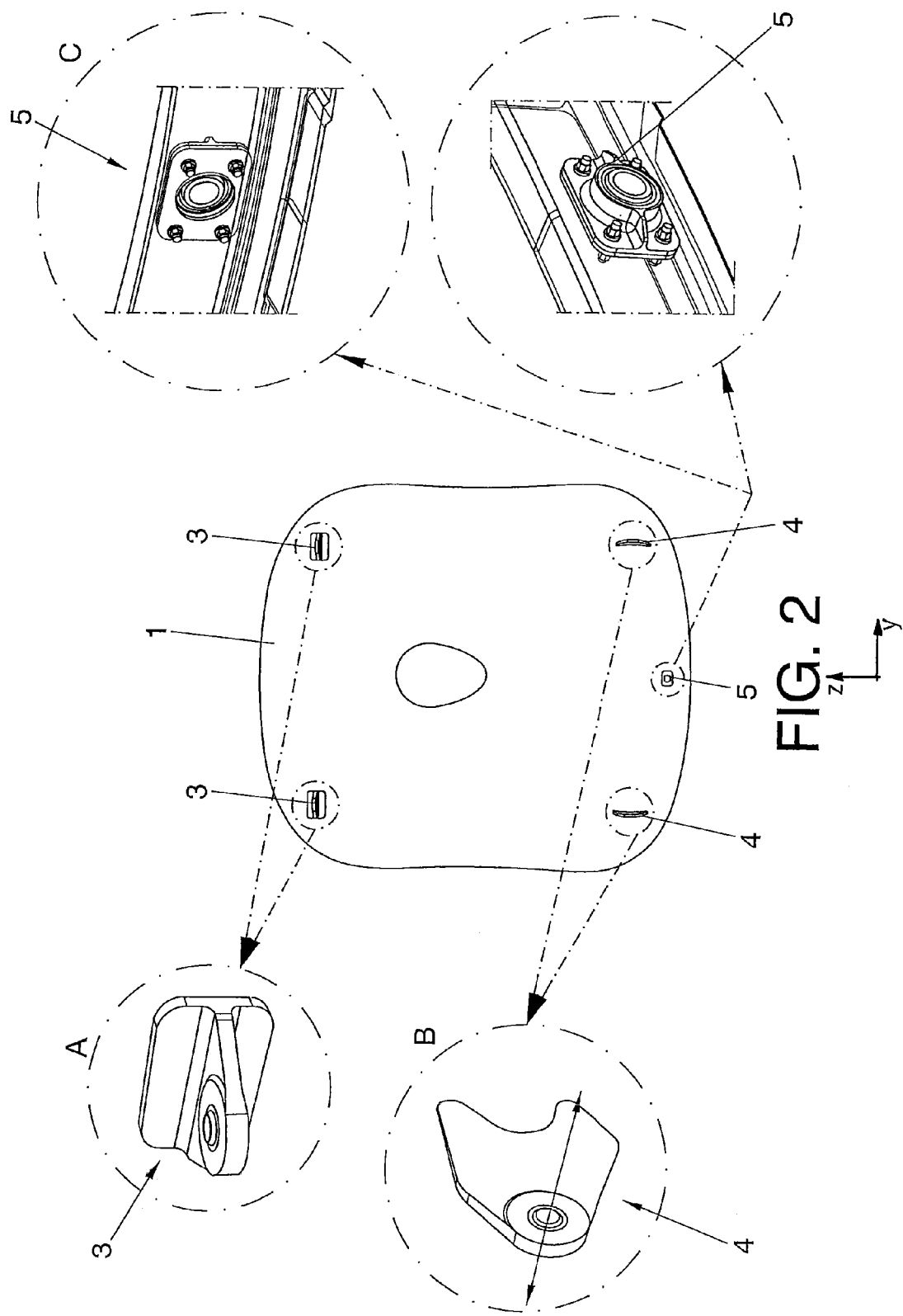
FIG. 2 depicts a frontal view of the tail cone end with the fittings installed and with enlarged details showing the different fittings.
Figure 3:
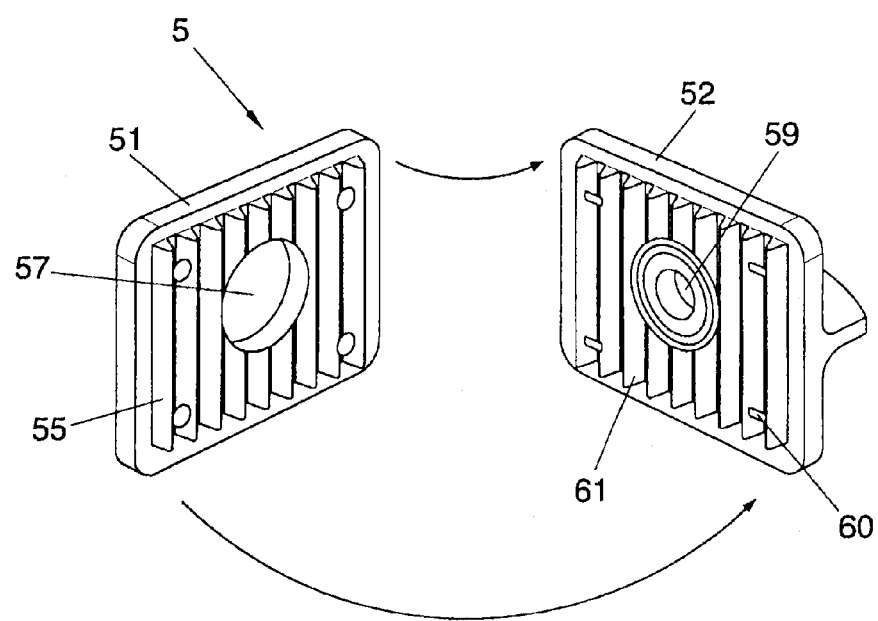
FIG. 3 shows the balancer fitting according to a first embodiment of the present invention.
Figure 4A:
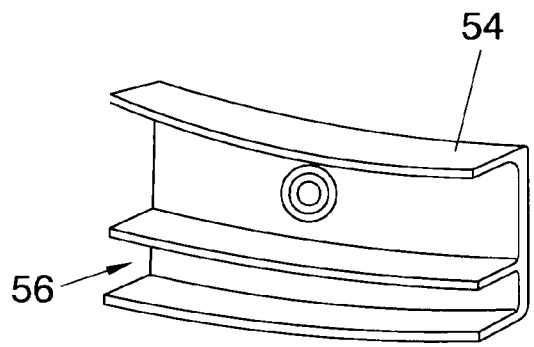
FIGS. 4a to 4d show balancer fitting according to the first embodiment, mounted on a frame, being 4a a perspective view, 4b a frontal view, 4c a cross sectional view along E-E line sketched in FIGS. 4b and 4d a side view.
Figure 4B:
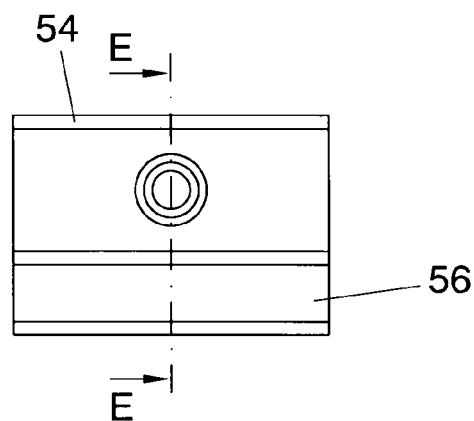
Figure 4C:
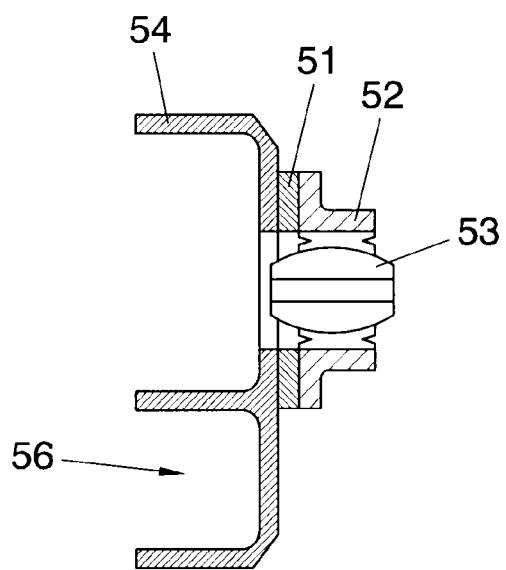
Figure 4D:
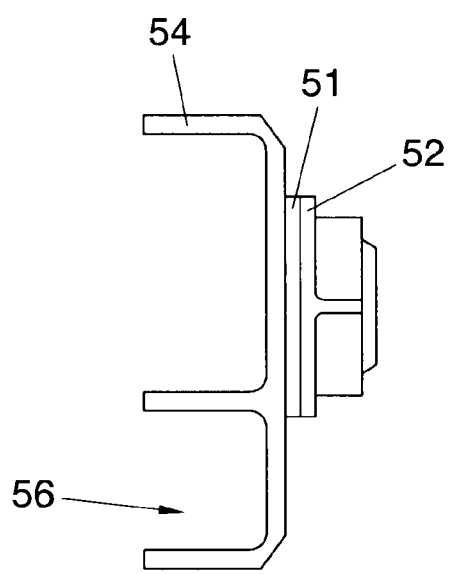

FIG. 1 shows a rear fuselage of an aircraft comprising a tail cone end (1) and a rest of the rear fuselage (2). The tail cone end (1) is attached to the rest of the rear fuselage (2) by means of an attachment system comprising two upper lugs (3), two lower lugs (4) and a detachable balancer (5), as shown in FIG. 2 and enlarged details therein.

The balancer fitting (5) of the present invention is adjustable. It is locked in Z and Y directions of a Cartesian axis and it is movable along an X direction of the Cartesian axis. Consequently, the balancer fitting of the present invention allows changing the interface point by allowing an adjustment in the Z and Y directions of a Cartesian axis and in addition is able to slide along the X direction of a Cartesian axis. Thus, the balancer fitting (5) provides guidance for the tail cone end (1) and the rest of the rear fuselage (2).

In one embodiment of the present invention, the balancer fitting (5) is a two parts fitting comprising a first fitting (51) having a first concentric hole (57) and a second fitting (52) having a second concentric hole (59). The first fitting (51) and the second fitting (52) are independent and are mounted on a frame (54). The second fitting (52) has a bearing (53) inside its concentric hole (59). When the first fitting (51) and the second fitting (52) are mounted together, the bearing (53) of the second fitting (52) fits into the concentric hole of the first fitting (57).

Preferably, the bearing (53) is a ball-and-socket joint.

Preferably, the first fitting (51) has a fluting contact surface (55) and the second fitting (52) has a fluting contact surface (61). Those fluting contact surfaces are between the first and the second fittings (51 and 52) in order to permit an adjustment in the Y and Z directions of the Cartesian Axis.

The first fitting (51) and the second fitting (52) are joined by screws (58). The fluting contact surface of one of the fittings, the first fitting (51) or the second fitting (52) comprises extended holes (60) for the screws (58) in order to allow adjustments in the Z and Y directions of a Cartesian axis.

Preferably, the frame (54) comprises a hollow space (56) for seal allocation.

In a second embodiment of the invention the balancer fitting (5) is a combination of excentrical bushings having an external excentrical bushing (502) and an internal excentrical bushing (501).

Preferably, in this second embodiment, the balancer fitting comprises an external excentrical bushing (502), an internal excentrical bushing (501), a bearing (503) mounted on the internal bushing (501), and a washer (504).

Preferably, the bearing (503) is a ball-and-socket joint.

During the previous setting of this second embodiment of the invention, as the external bushing (502) and the internal bushing (501) are excentrical, they adjust to the interface point of the bearing (503). When that adjustment has been made, the external bushing (502) and the internal bushing (501) rotate together.

An object of the invention is to provide a method of assembly a tail cone end to the rest of a rear fuselage of an airplane. The method proposed by the present invention comprises the following steps:

to install the balancer fitting (5);
to install the lower lugs (4); and
to install the upper lugs (3).

The balancer fitting (5) remains installed during the second and the third step of the method.

In another embodiment of the invention the installation of the upper lugs (3) can be done before the installation of the lower lugs (4).

Preferably, the installation of the lower lugs (4) is done before the installation of the upper lugs (3) because they are placed closer to the balancer fitting (5) thus facilitating the adjustment tolerances and the accessibility of the people that has to assure the assembly.

The invention claimed is:

1. A rear fuselage of an aircraft comprising a tail cone end having a cone axis extending generally along an X direction of a Cartesian system, and a remainder of the rear fuselage, where the tail cone end is attached to the remainder of the rear fuselage by an attachment system comprising two upper lugs, two lower lugs and a detachable balancer fitting at an interface point of said tail cone end and said remainder of the rear fuselage, said balancer fitting providing guidance for alignment of the tail cone end and the remainder of the rear fuselage during the assembly of the rear fuselage, wherein the balancer fitting comprises means to modify the interface point by allowing an adjustment in the Z and Y direction of the Cartesian system and is movable along the X direction for alignment of the tail cone end and the remainder of the rear fuselage, and wherein the means to modify the interface point of the balancer fitting comprises two parts including a first fitting having a first concentric hole, and a second fitting having a second concentric hole and a bearing inside the second concentric hole, the first and the second fittings being independent and mounted on a frame, the bearing being provided inside the second concentric hole such that when the first fitting and the second fitting are mounted together, the bearing fits into the first concentric hole of the first fitting, wherein the bearing is a ball and socket joint.

2. The rear fuselage of an aircraft according to claim 1, wherein the means to modify the interface point further comprises a fluting contact surface in the first fitting and a fluting contact surface in the second fitting.

3. The rear fuselage of an aircraft according to claim 1, wherein the frame comprises a hollow space for seal allocation.

4. The rear fuselage of an aircraft according to claim 2, wherein the first and second fitting are joined by screws and the fluting contact surface of one of the first fitting or second fitting has extended holes for the screws in order to allow adjustments in the Z and Y directions to align the tail cone end to the remainder of the rear fuselage.

5. A rear fuselage of an aircraft comprising a tail cone end having a cone axis extending generally along an X direction of a Cartesian system, and a remainder of the rear fuselage, where the tail cone end is attached to the remainder of the rear fuselage by an attachment system comprising two upper lugs, two lower lugs and a detachable balancer fitting at an interface point of said tail cone end and said remainder of the rear fuselage, said balancer fitting providing guidance for alignment of the tail cone end and the remainder of the rear fuselage during the assembly of the rear fuselage, wherein the balancer fitting comprises means to modify the interface point by allowing an adjustment in the Z and Y direction of the Cartesian system and is movable along the X direction for alignment of the tail cone end and the remainder of the rear fuselage, and wherein the balancer fitting is a combination of excentrical bushings having an external excentrical bushing and an internal excentrical bushing, wherein the balancer fitting further comprises a ball and socket joint mounted on the internal excentrical bushing and a washer, wherein the means to modify the interface point of the balancer fitting comprises the external excentrical bushing and the internal excentrical bushing.

* * * * *